United States Patent [19]

Katou

[11] 4,219,752
[45] Aug. 26, 1980

[54] ROTOR FOR A MAGNETO GENERATOR

[75] Inventor: Aritsune Katou, Nagoya, Japan

[73] Assignee: Nippondenso Co., Ltd., Kariya, Japan

[21] Appl. No.: 916,522

[22] Filed: Jun. 19, 1978

[30] Foreign Application Priority Data

Jun. 24, 1977 [JP] Japan .............. 52-83841[U]

[51] Int. Cl.² ........................ H02K 21/12
[52] U.S. Cl. ...................... 310/156; 310/67 R; 310/91; 310/153
[58] Field of Search ............ 310/153, 74, 91, 42, 310/67, 156, 70 A, 70 R; 123/149 D, 149 C; 322/48, 51; 324/174

[56] References Cited

U.S. PATENT DOCUMENTS

| | | |
|---|---|---|
| 1,792,530 | 2/1931 | Coughlin ............ 123/149 D |
| 2,568,479 | 9/1951 | Armstrong .......... 310/153 |
| 3,258,623 | 6/1966 | Phelon ............... 310/153 |
| 3,663,850 | 5/1972 | Phelon ............... 310/153 |
| 3,828,212 | 8/1974 | Harkness ............ 310/156 |
| 4,012,651 | 3/1977 | Burson .............. 310/153 |
| 4,115,716 | 9/1978 | Ogasawala ......... 310/153 |

Primary Examiner—R. Skudy
Attorney, Agent, or Firm—Cushman, Darby & Cushman

[57] ABSTRACT

A rotor for a magneto generator including a plurality of permanently magnetized magnets radially disposed in the inner peripheral surface of an iron cup-shaped flywheel. The rotor has a ring-shaped magnet case formed with a plurality of magnet mounting portions for accommodating the magnets and has a plurality of wedge mounting portions provided between the magnet mounting portions for accommodating a plurality of wedges adapted to press and hold the magnets in place.

5 Claims, 6 Drawing Figures

ROTOR FOR A MAGNETO GENERATOR

BACKGROUND OF THE INVENTION

FIELD OF THE INVENTION

The present invention relates to improvements in the magnet mounting structure for magneto generator rotors.

Rotors of this type having many different constructions are known in the art, and particularly known are rotors of the type having the magnets mounted in a protective magnet case in consideration of the brittleness of ferrite magnets are now in wide use. The rotors disclosed in Japanese Utility Model Application Laid-Open Publication No. 48-101104 published and Japanese Patent Application Laid-Open Publication No. 49-9602 published Jan. 26, 1974 are typical of these prior art rotors. Both of these rotors are basically constructed so that the ferrite magnets are received in the magnet case and each pole piece is fastened to the iron cup-shaped flywheel by two small screws, thus fixing the magnet case and the ferrite magnets to the flywheel.

As a result, the above-mentioned prior art rotors are disadvantageous in that due to the use of screws for fixing purposes, a screwing operation is required which involves complicated and time consuming control of screwing torque, and moreover there are other disadvantages such as requiring a large number of parts on the whole and requiring complicated assembling operation, both of which make automatic assembling of such rotors difficult and costly.

SUMMARY OF THE INVENTION

With a view to overcoming the foregoing deficiencies, it is the object of the present invention to provide a rotor for a magneto generator in which a plurality of magnets are inserted into a plurality of magnet mounting portions of a ring magnet case which is fitted in the inner peripheral surface of an iron cup-shaped flywheel, and a wedge is driven into each of a plurality of wedge mounting portions provided between the magnets of the magnet case, whereby by virtue of the dimensional relationship between the magnet mounting portions and the magnets, the magnets are pressed against the iron flywheel by the magnet case, thus making it possible to easily fix the magnet case to the iron flywheel by the wedges after the magnets have been assembled in the magnet case and thereby greatly decreasing the manufacturing cost through the use of automation.

DESCRIPTION OF THE PREFERRED EMBODIMENTS

Figure 1:
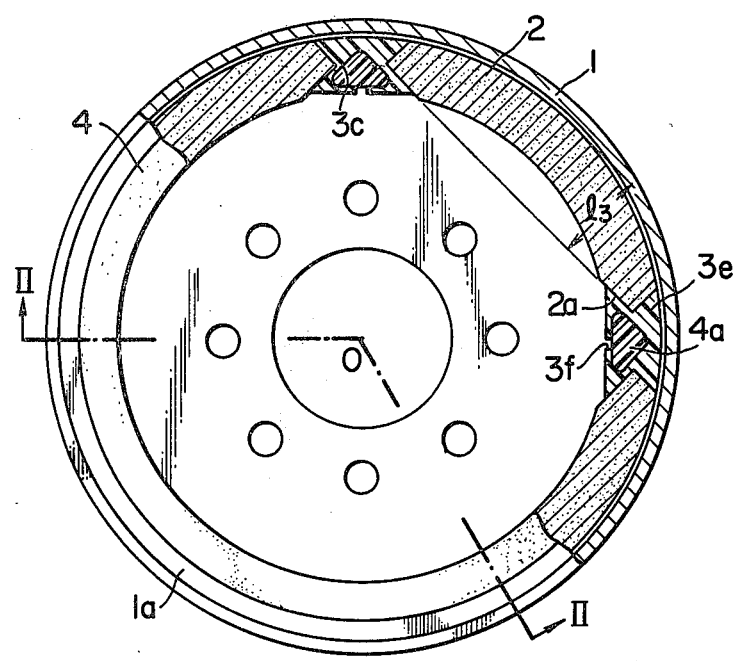
FIG. 1 is a partially sectional front view showing an embodiment of a rotor for a magneto generator according to the present invention.
Figure 2:
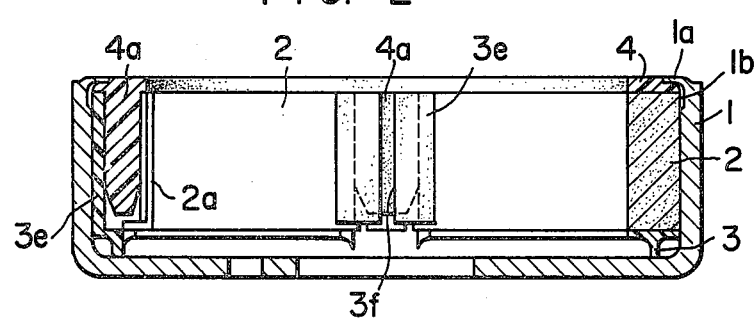
FIG. 2 is a longitudinal sectional view taken along the line II—II of FIG. 1.
Figure 3:
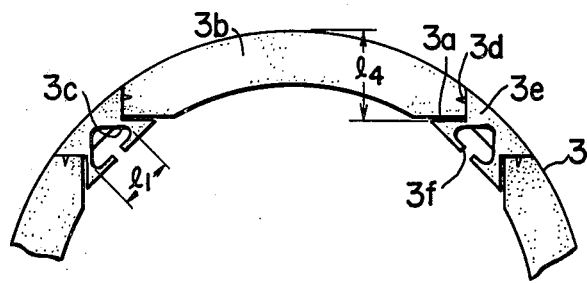
FIG. 3 is a partial front view of the magnet case used with the rotor shown in FIG. 1.

The present invention will now be described in greater detail with reference to the illustrated embodiments.

Referring now to FIGS. 1 to 5, numeral 1 designates an iron cup-shaped flywheel having a C-shaped cross-section and produced by for example subjecting a magnetic sheet such as iron sheet to press drawing, and 2 radially permanently magnetized arcuate ferrite magnets each having an abutting face 2a at each end and a dimension $l_3$ which is slightly smaller than a dimension $l_4$ of a magnet case 3 which will be described later. Numeral 3 designates the magnet case which is made of a non-magnetic material, such as, aluminum or synthetic resin which is formed into a ring shape, 3a an abutting face formed on each side of each of a plurality of dovetailed columnar portions 3e arranged at equal spacing so as to abut against the corresponding abutting face 2a of the magnets 2, and 3b a plurality of magnet mounting portions defined between the columnar portions 3e. Numeral 3c designates a wedge mounting portion of triangular shape in cross-section which is formed in each of the columnar portions 3e and whose base has a dimension $l_1$ which is slightly smaller than a dimension $l_2$ of the base of wedges 4a on a wedge ring 4 which will be described later, and a part of the base of each wedge mounting portion 3c is inwardly opened by an opening 3f. Numeral 3d designates a keeper formed on each side of each columnar portions 3e in continuation with the abutting face 3a to prevent the circumferential play of the magnets 2 and thereby to prevent the occurrence of any circumferential play even if the magnets 2 of the minimum size are inserted.

Figure 4:
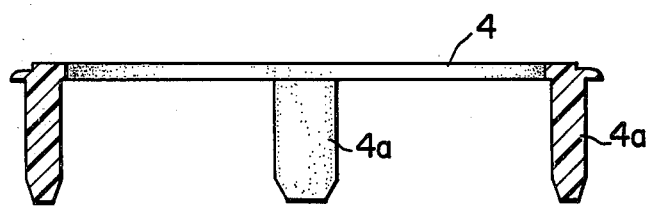
FIG. 4 is a longitudinal sectional view of the wedge ring used with the rotor shown in FIG. 1.
Figure 5:
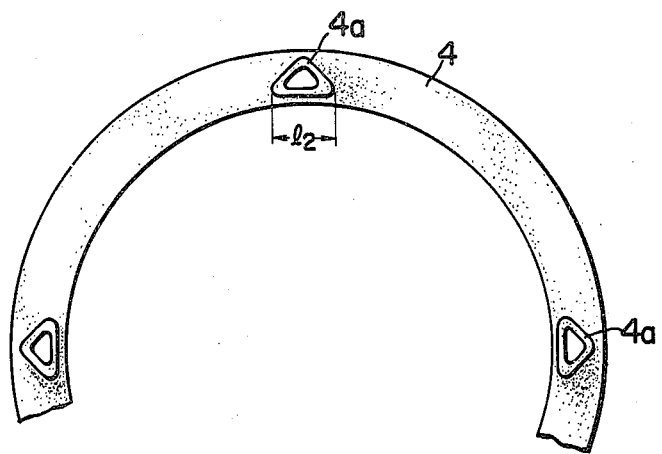
FIG. 5 is a partial front view of the wedge ring shown in FIG. 4.

Numeral 4 designates the wedge ring of a nonmagnetic material, e.g., aluminum or synthetic resin which is formed into a ring shape, and a plurality of the wedges 4 of triangular columnar shape are integrally formed at equal spacing in suitable positions of the wedge ring 4. As shown in FIG. 4, each of the wedges 4 is tapered toward the forward end for easy insertion into the wedge mounting portion 3c. The iron flywheel 1 is formed at the open end with a tying caulking lip 1a, and a binder dripping annular groove 1b is also formed at the open end.

With the construction described above, after the magnet case 3 has been placed in the iron flywheel 1 and the magnets 2 have been inserted into the magnet mounting portions 3b of the magnet case 3, the wedges 4a of the wedge ring 4 are inserted into the wedge mounting portions 3c of the magnet case 3. In this case, since the relation between the dimension $l_3$ of the magnets 2 and the dimension $l_4$ of the magnet mounting portions 3b of the magnet case 3 is $l_4 > l_3$, the magnets 2 can be easily placed or inserted into the magnet mounting portions 3b of the magnet case 3. There is also a relation $l_2 > l_1$ between the dimension $l_1$ of the wedge mounting portions 3c of the magnet case 3 and the dimension $l_2$ of the wedges 4a of the wedge ring 4, so that when the wedges 4a are inserted into the wedge mounting portions 3c, the wedge mounting portions 3c of the magnet case 3 are expanded through the openings 3f by overcoming the resilience of the columnar portions 3e and the abutting faces 3a of the magnet case 3 are pressed against the abutting faces 2a of the magnets 2, thus pressing the magnets 2 against the iron flywheel 1 and thereby firmly fixing the magnets 2 to the iron flywheel 1. When it is desired to increase the fixing strength, a bonding agent may be dripped in the groove 1b of the iron flywheel 1 so that the gap between the magnets 2 and the iron flywheel 1 is filled with the bonding agent and the bonding agent is also introduced between the magnet case 3 and the iron flywheel 1 and between the magnets 2, thus satisfactorily bonding the magnets 2 to the iron flywheel 1 and the magnet case 3. Lastly, the caulking lip 1a of the iron flywheel 1 is curled by caulking, and the magnet case 3 and the wedge ring 4 are firmly fixed to the iron flywheel 1.

Figure 6:
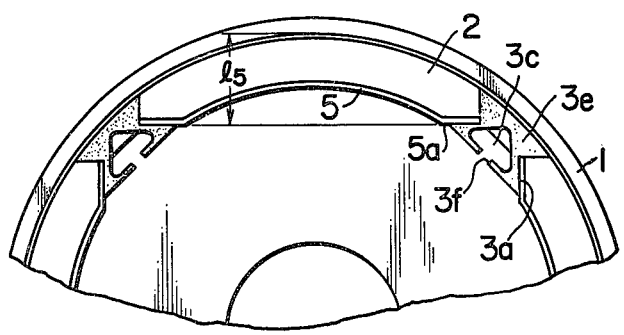
FIG. 6 is a partial front view of another embodiment of the rotor according to the invention.

Another embodiment of the invention will now be described in which a pole piece 5 is formed on the inner surface of each magnet 2 as shown in FIG. 6. Also in this embodiment, there is no need to change or modify the shape of the iron flywheel 1, the magnet case 3 and the wedge ring 4, and thus these component parts can be fully used in common for the two embodiments. In the second embodiment, the pole pieces 5 are formed to conform with the shape of the inner surface of the magnets 2 and the abutting faces 3a of the magnet case 3 are adapted to abut against abutting faces 5a of the pole pieces 5. As a result, the similar effects as the first embodiment may be obtained by ensuring the same dimensional relation as the dimension $l_3$ of the first embodiment for a dimension $l_5$ of the radially superposed magnet 2 and the pole piece 5.

While, in the above-described embodiments, the wedges 4a are made integral with the wedge ring 4, the wedges 4a may be provided separately.

It will thus be seen that the present invention has a great advantage that the relation $l_4 > l_3$ between the dimension $l_3$ of the magnets and the dimension $l_4$ of the magnet mounting portions of the magnet case ensures easy placement of the magnets in the magnet case, and the relation $l_2 > l_1$ between the dimension $l_1$ of the wedge mounting portions of the magnet case and the dimension $l_2$ of the wedges permits that when the wedges are inserted the wedge mounting portions of the magnet case are expanded to press the magnets against the iron flywheel, thus ensuring easy and firm fixing of the magnets and the magnet case to the iron flywheel without using any screws and thereby making automated assembling possible.

What is claimed is:

1. A rotor for a magnet generator comprising:
a cup-shaped magnetic member,
a plurality of arcuate permanent magnet members each having abutting surfaces at both its ends,
a ring-shaped nonmagnetic case disposed in said cup-shaped magnetic member, said case having a plurality of resilient dovetailed columnar members for securing said magnet members in said case between adjacent columnar members positioned at the abutting surfaces of said magnet, at least one of said columnar members having therein a wedge mounting slot, and
a ring-shaped nonmagnetic wedge member supporting at least one wedge which is inserted into said wedge mounting slot to expand said mounting slot thereby pressing the corresponding dovetailed columnar member against the abutting surfaces located adjacent said member.

2. A rotor according to claim 1, wherein each of said dovetailed columnar members has a projection which is received within an abutting surface of an adjacent magnet member for preventing movement of said magnet members.

3. A rotor according to claim 1, wherein said magnet member comprises a permanent magnet and a pole core.

4. A rotor according to claim 1, wherein the abutting surfaces of each magnet member extend beyond a circle defined by inner peripheral surfaces of said magnet members.

5. A rotor according to claim 1, wherein said dovetailed columnar member having a wedge mounting slot is provided with an opening for broadening the member when said wedge is inserted into said slot.

* * * * *